(12) United States Patent
Walter

(10) Patent No.: US 6,751,545 B2
(45) Date of Patent: Jun. 15, 2004

(54) AIRCRAFT TAXI PLANNING SYSTEM AND METHOD

(75) Inventor: Randy L. Walter, Ada, MI (US)

(73) Assignee: Smiths Aerospace, Inc., Grand Rapids, MI (US)

( * ) Notice: Subject to any disclaimer, the term of this patent is extended or adjusted under 35 U.S.C. 154(b) by 0 days.

(21) Appl. No.: 10/078,703

(22) Filed: Feb. 20, 2002

(65) Prior Publication Data

US 2003/0105579 A1 Jun. 5, 2003

Related U.S. Application Data

(60) Provisional application No. 60/336,752, filed on Dec. 4, 2001, provisional application No. 60/337,182, filed on Dec. 4, 2001, provisional application No. 60/337,192, filed on Dec. 4, 2001, and provisional application No. 60/337,295, filed on Dec. 4, 2001.

(51) Int. Cl.$^7$ ................................................. G06F 7/00
(52) U.S. Cl. .................... 701/120; 701/35; 340/972; 340/990; 342/34; 244/158 R; 244/183; 455/456
(58) Field of Search .......................... 701/120, 16, 207, 701/11, 13, 14, 214; 340/961, 947, 933, 453, 972, 979, 990, 995; 342/450, 454, 34, 118, 36; 244/158 R, 183; 455/456

(56) References Cited

U.S. PATENT DOCUMENTS

| | | | | |
|---|---|---|---|---|
| 3,706,969 A | * | 12/1972 | Paredes | 340/26 |
| 4,151,595 A | * | 4/1979 | Pressiat | 340/24 |
| 5,268,698 A | * | 12/1993 | Smith, Sr. et al. | 342/450 |
| 5,629,691 A | * | 5/1997 | Jain | 340/961 |
| 5,913,912 A | * | 6/1999 | Nishimura et al. | 701/35 |
| 6,246,342 B1 | * | 6/2001 | Vandevoorde et al. | 340/961 |
| 6,282,488 B1 | * | 8/2001 | Castor et al. | 701/120 |
| 6,353,794 B1 | * | 3/2002 | Davis et al. | 701/201 |
| 6,411,890 B1 | * | 6/2002 | Zimmerman | 701/120 |
| 6,453,231 B1 | | 9/2002 | Ooga | 701/120 |
| 6,463,383 B1 | * | 10/2002 | Baiada et al. | 701/120 |
| 2001/0049580 A1 | | 12/2001 | Kusano et al. | 701/200 |
| 2002/0120392 A1 | * | 8/2002 | Stratton et al. | 701/120 |

\* cited by examiner

*Primary Examiner*—Thomas G. Black
*Assistant Examiner*—Tuan C To
(74) *Attorney, Agent, or Firm*—Price, Heneveld, Cooper, DeWitt & Litton, LLP

(57) ABSTRACT

A taxi planning system for aircraft provides an intuitive user interface for entering and selecting taxi plans quickly and easily. The system includes predefined reduced selection menus that prompt the pilot with feasible taxi choices. Predefined standard routes allow the pilot to select a taxi route with a minimum of keystrokes and in a minimum of time. A display screen communicates the selection menus and standard routes to the pilot who makes a selection with as little as one keystroke. A database comprising a linked list structure facilitates a flexible system that is able to represent a wide variety of airport runways, taxiways, gates, ramps, and other airport structures. The selected taxi route is communicated to other aircraft systems such as head-down displays, head-up displays, flight management computers, communication systems, and the like.

20 Claims, 6 Drawing Sheets

AIRCRAFT TAXI PLANNING SYSTEM AND METHOD

CROSS-REFERENCE TO RELATED APPLICATIONS

This application claims the benefit of U.S. Provisional Application Nos. 60/336,752; 60/337,182; 60/337,192; and 60/337,295, all filed Dec. 4, 2001, the disclosure of each of which is hereby incorporated by reference.

BACKGROUND OF THE INVENTION

1. Field of the Invention

The present invention relates to aircraft surface guidance systems (SGS) and, in particular, to a user interface comprising a menu structure for quickly selecting a desired taxi path for an aircraft at an airport.

2. Technical Background

There is considerable interest in enhancing the field of surface guidance for aircraft. After an aircraft lands on a runway at an airport, the next step is to taxi the aircraft to a desired destination such as a passenger loading/unloading gate. A pilot can easily become confused or lost amid the many runways, taxiways, ramps, and buildings that make up an airport. The problem is more significant at large airports and is particularly significant at night when the multitude of lights can make it more difficult to taxi the aircraft to the desired destination.

Efficient taxi operations save time and money. With airports becoming more crowded, aircraft often spend considerable time taxiing between runways and gates. Taxi time is even longer if the pilot makes a wrong turn, becomes lost, or blunders onto the wrong runway or taxiway. In addition, a wrong turn or navigation blunder can cause delays for other aircraft at the airport.

A main feature of an airport surface guidance capability is the presentation of an airport map that is readily available to the pilot. One conventional approach to present such a map is on a head-down display (HDD) that is displayed in the forward field of view of the pilot. The pilot typically enters or selects a taxi path that has been approved by ground controllers. The display then indicates the current aircraft position and the taxi path is shown overlaid on the airport map. The display gives a pilot situational awareness of where the aircraft is relative to the selected taxi path. A key aspect to a practical avionics implementation for surface guidance must generally include a user interface for the intuitive and rapid entry of air traffic control (ATC) radio communicated taxi instructions into the on-board SGS system by the pilot or crew.

To make surface guidance operationally acceptable, it is imperative to provide the aircraft crew with an intuitive and rapid means to insert taxi instructions into the surface guidance system and to integrate that operation with the normal aircraft operations that are familiar to the pilot/crew. Prior attempts to implement surface guidance separated the taxi planning step from the enroute planning process. This typically creates a significant training burden for the airlines or aircraft fleet operator.

Any aircraft taxi planning system should be adequate not only to accomplish the task of receiving taxi instructions, but to also make the user interface intuitive such that training time is minimized. It is also desirable to facilitate rapid taxi route selection and minimize entry errors.

The continuing goal, therefore, is to find ways to reduce costs, reduce taxi errors, minimize training, reduce taxi time, and improve airport efficiency.

SUMMARY OF THE INVENTION

To address the goals stated above and other goals, the inventive taxi planning system includes a unique user interface and a database comprising information descriptive of the runways and taxiways for an airport. The invention integrates the taxi planning process with the enroute planning process and uses similar procedures. This creates an intuitive user interface and further creates an operationally acceptable implementation of taxi planning that significantly reduces crew training time and costs. The use of data entry techniques in accordance with the invention minimizes the time required to enter taxi planning commands and also minimizes taxi planning errors.

According to one aspect of the present invention, the taxi planning system is integrated as an extension of the flight management system (FMS) which provides the enroute planning function for the aircraft. The page formats of the invention are preferably an extension of the page formats used by the FMS for enroute planning, and is therefore intuitive and easily learned by pilots and crew.

In another aspect of the invention, selection menus are used to simplify taxi route entry and reduce errors. The invention is provided with the current location of the aircraft (e.g., a runway or gate). This information is previously entered by the pilot or is received from another aircraft system. The system also is preferably provided with a destination (e.g., runway 27R or gate A25). Using this preliminary information, the invention looks up the valid taxi selections associated with the current location and displays them to the pilot as a menu. As the pilot selects a leg of the taxi path, the screen is scrolled up and a new menu of valid taxi leg selections is presented. The process proceeds quickly until the taxi plan is complete. In another embodiment, predefined standard routes are stored in memory and are made available for selection. In yet another embodiment, a predefined standard taxi route is received from ATC via a data link.

Yet another aspect of the invention is the database structure used to implement the invention. The database structure preferably uses a linked list that is flexible for implementing various airport configurations. The database can be updated frequently without the need to alter program software. More preferably, the invention uses a linked list created from two data tables.

It is clear that the invention is a significant improvement over the prior art systems. Further, those skilled in the art recognized that the invention is not limited to use with an FMS. Other processors, display screens, and data entry devices may be used to practice the invention.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

Figure 1:
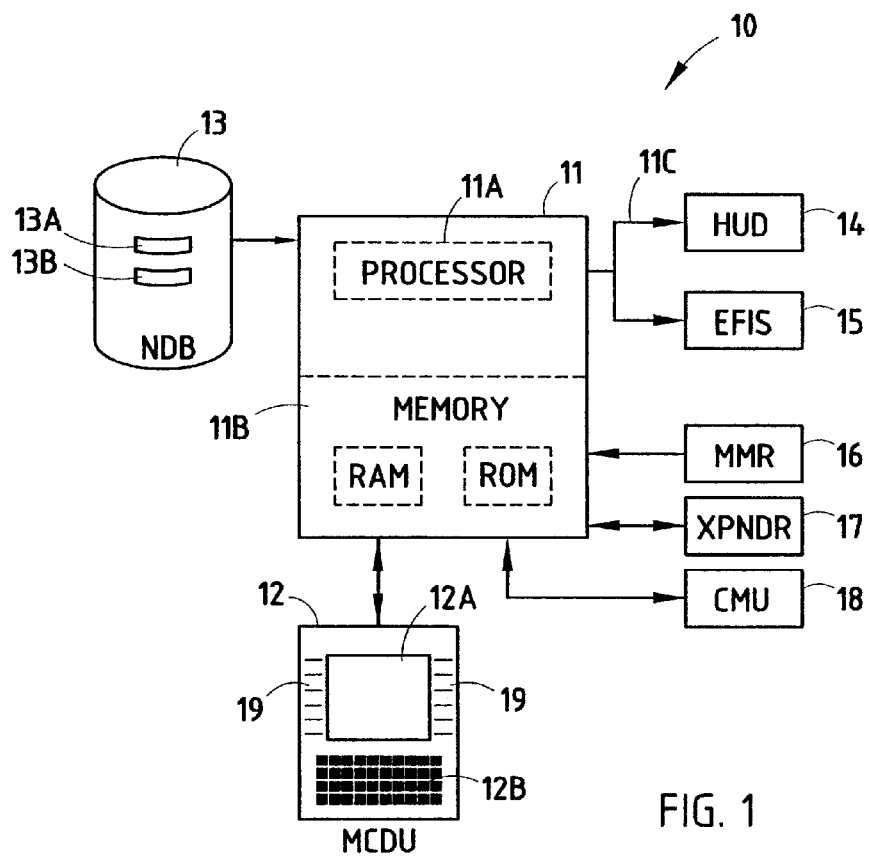
FIG. 1 is a block diagram of one embodiment of a taxi planning system according to the invention.

Reference will now be made in detail to the present preferred embodiments of the invention, examples of which are illustrated in the accompanying drawings. Wherever possible, the same reference numerals will be used throughout the drawings to refer to the same or like parts.

An exemplary embodiment of the taxi planning system according to the present invention is shown in FIG. 1, and is designated generally throughout by reference numeral 10.

The components of the taxi planning system of the present invention will first be briefly described and then described in detail. The most common use for the invention is as an integrated element in the FMS of an aircraft, such as a commercial passenger or cargo jet, and therefore the following discussion will describe the invention in relation to such an application.

Referring first to FIG. 1 there is shown a block diagram of one embodiment of the taxi planning system according to the invention and related aircraft systems. All of the aircraft systems can comprise the invention and therefore they are collectively referred to as taxi planning system 10. Taxi planning system 10 may comprise flight management computer (FMC) 11, multifunction control display unit (MCDU) 12, navigation database (NDB) 13, head-up display (HUD) 14, electronic flight instrument system (EFIS) 15, multi-mode receiver (MMR) 16, transponder 17, and communications management unit (CMU) 18. FMC 11 and MCDU 12 are generally referred together as a flight management system (FMS).

FMC 11 comprises a processor 11A, and memory 11B. Processor 11A may include any data processor suitable for receiving and processing commands and data. Processor 11A is preferably a microprocessor with sufficient throughput to complete the required FMS and taxi planning tasks in real-time. Memory 11B preferably comprises both random access memory (RAM) for storing dynamic data and variables, and read-only memory (ROM) for storing program data and static data. Processor 11A communicates with memory 11B to retrieve program instructions and data and to manipulate and store variables. Processor 11A is also in communication with NDB 13.

NDB 13 comprises airport taxi data describing airport runways, taxiways, gates, ramps, and various other airport structures as desired. The airport taxi data is stored in the linked list 13A and standard taxi routes 13B are also stored in the database. Airport taxi data comprises data such as runway data that represents the position and width of runways, taxiway data that represents the position of taxiways, and gate data that represents the position and heading for a gate. NDB 13 is preferably rewritable or replaceable so that the airport data is easily updated as needed and so that the data remains current regarding changes to airport runways, taxiways, and the like. NDB 13 is constructed of any of various memory storage technologies such as PROM, EPROM, EEPROM, magnetic disk drives, optical disk drives, or various combinations of these and similar devices. The linked list described below is preferably stored in the NDB 13.

The user interface is preferably accomplished through MCDU 12 which communicates with FMC 11 and processor 11A. MCDU 12 comprises a display screen 12A, line select keys 19, and a key pad 12B. MCDU 12 is commonly used to enter enroute flight planning commands to the FMC 11 and to output enroute flight data to the pilot, crew, or operator via display screen 12A. The operation of line select keys 19 allow quick selection and deletion of displayed items. The invention preferably uses this preexisting user interface device to accomplish the user interface for ground navigation at airports, although other user interfaces may also be used to practice the invention. For example, other displays such as the EFIS 15 or HUD 14 may be used as part of the user interface if desired.

HUD 14 and EFIS 15 are shown in communication with FMC 11 via taxi path signal 11C. Taxi path signal 11C comprises data representative of a selected taxi path. HUD 14 projects an image to a combiner positioned along the forward line of sight of the pilot such that a pilot can view the image and also look out the front windshield of the aircraft simultaneously. EFIS 15 (also referred to as a HDD) is typically positioned below the front windshield of the aircraft. EFIS 15 comprises one or more display screens which are typically implemented using cathode ray tubes (CRTs), flat panel displays, or functionally similar display devices. When a taxi plan is selected, the plan is preferably displayed to the pilot on either the HUD 14 or EFIS 15.

Several communications systems are also coupled to the FMC 11. MMR 16 receives navigation or position signals such as global positioning system (GPS) signals, differential GPS (DGPS), local area augmentation system (LAAS) signals, wide area augmentation system (WAAS) signals, and the like. These signals are communicated to the FMC 11 where the position of the aircraft relative to airport features is determined. This aircraft position information is then used to compute appropriate taxi selection options to the pilot.

Transponder 17 and CMU 18 provide additional input and output communications channels. Transponder 17, for example, may receive signals such as automatic dependent surveillance broadcast (ADS-B) from other aircraft or ATC. CMU 18 comprises a data link with ATC or similar controlling authority through which taxi plans and instructions are communicated, negotiated, modified, and approved or denied.

Figure 2:
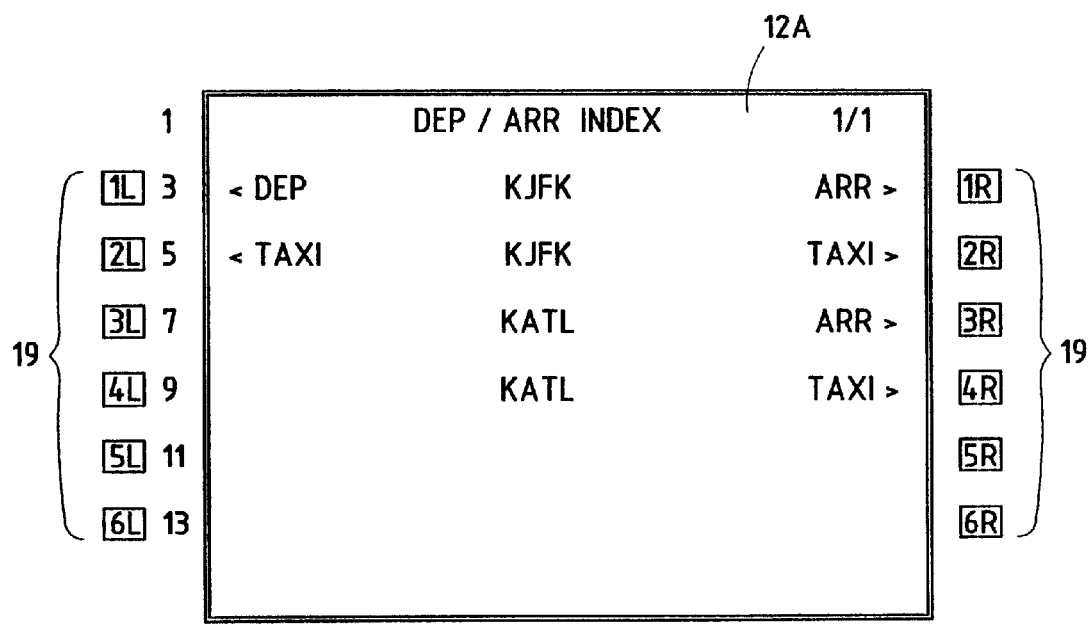
FIG. 2 is a departure/arrival index page displayed on an MCDU according to the invention.
Figure 3:
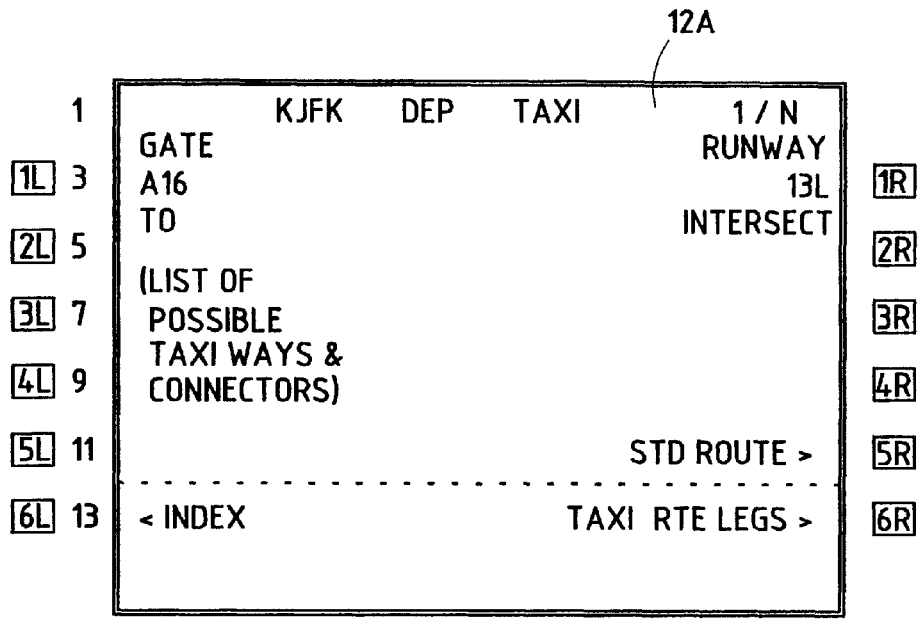
FIG. 3 is a departure taxi planning page according to the invention.

FIGS. 2–5 illustrate the user interface. User access to the invention is preferably accomplished via the DEP/ARR INDEX page as shown in FIG. 2. FIG. 2 shows the display screen 12A and line select keys (LSKS) 19. Line select keys 19 are individually identified as 1L through 6L and 1R through 6R and are used to select a desired option. To access a taxi planning page the pilot actuates either line select key 2L, 2R, or 4R. This display is representative for an aircraft preparing for a flight from KJFK to KMEM. LSK 2L is actuated to plan the departure taxi path to the runway. LSK 2R is selected to plan a taxi path back to a gate if, for example, the aircraft is forced to return to KJFK. LSK 4R is selected to plan the arrival taxi path from the runway to the gate at the destination airport KMEM. Upon actuation of LSK 2L, the screen proceeds to the KJFK departure taxi page as shown in FIG. 3.

With the departure taxi page displayed, current gate location and destination runway are first obtained. This information may be recalled from memory, received from other aircraft systems, entered by the pilot on different FMS pages, or entered by the pilot on the current page. If this information has not been entered the pilot is prompted for locations via a menu of possible gates and then a menu of possible runways. Alternatively, the pilot can enter the gate and runway information via the scratchpad of the MCDU. After the gate and runway are obtained, the system accesses the NDB 13 and computes a menu of possible taxiways and/or connectors, and displays them on the screen 12A adjacent to LSKs 19. With each selection from the menu of possible taxiways and/or connectors, a new menu of the next possible selections appears under the "TO" header. The selected items are highlighted and the "TO" header drops to make room for the selected item above the "TO" header. The page is scrolled up or down to display appropriate information. Reselection of a highlighted item reestablishes the menu for that item and deselects prior items under the reselected item. The process continues until the destination runway is achieved. The "STD ROUTE" selection adjacent to LSK 5R appears after both the gate and runway data have been obtained. Selection of the standard route automatically selects a menu of predefined taxi paths, allowing selection of a taxi path from the current location to the destination with a single key stroke The determination of the appropriate menu selections is preferably achieved by use of a linked list and the algorithm discussed below.

Figure 4:
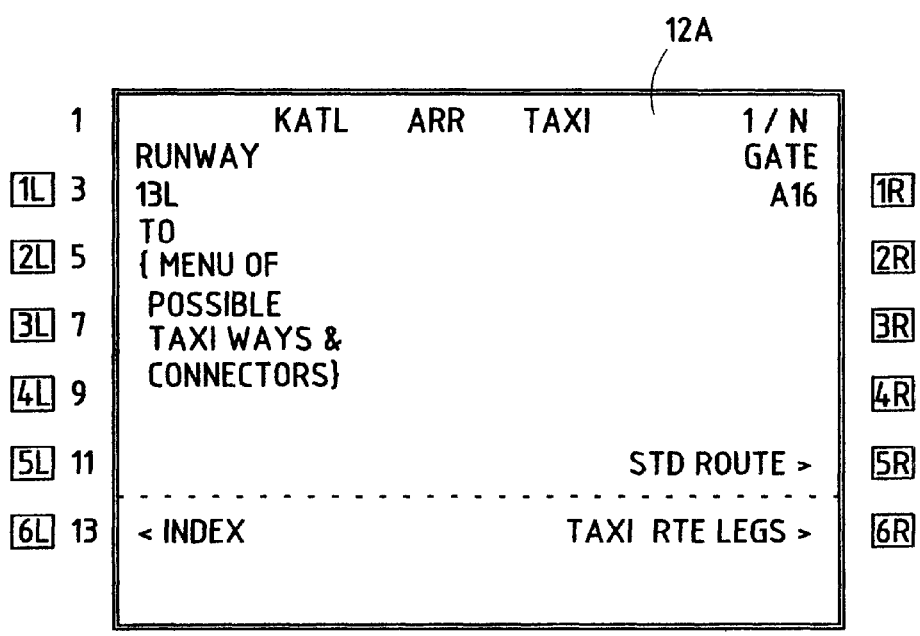
FIG. 4 is an example of an arrival taxi planning page according to the invention.

FIG. 4 illustrates an arrival page according to one embodiment of the current invention. The arrival page may be accessed by actuating LSK 4R on the departure/arrival index page, such as illustrated in FIG. 2. The runway and gate information is determined as discussed above. Processor 11A accesses the NDB 13 and computes a menu of possible taxiways and connectors. As each menu selection is made, a new menu of possible taxi choices is computed and displayed under the "TO" header. Selected items appear highlighted and the "TO" header drops to make room for the selected item. Reselection of a highlighted item reestablishes the menu for that item and deselects prior items under the reselected item. The "STD ROUTE" prompt appears after the runway and gate information is obtained.

Figure 5:
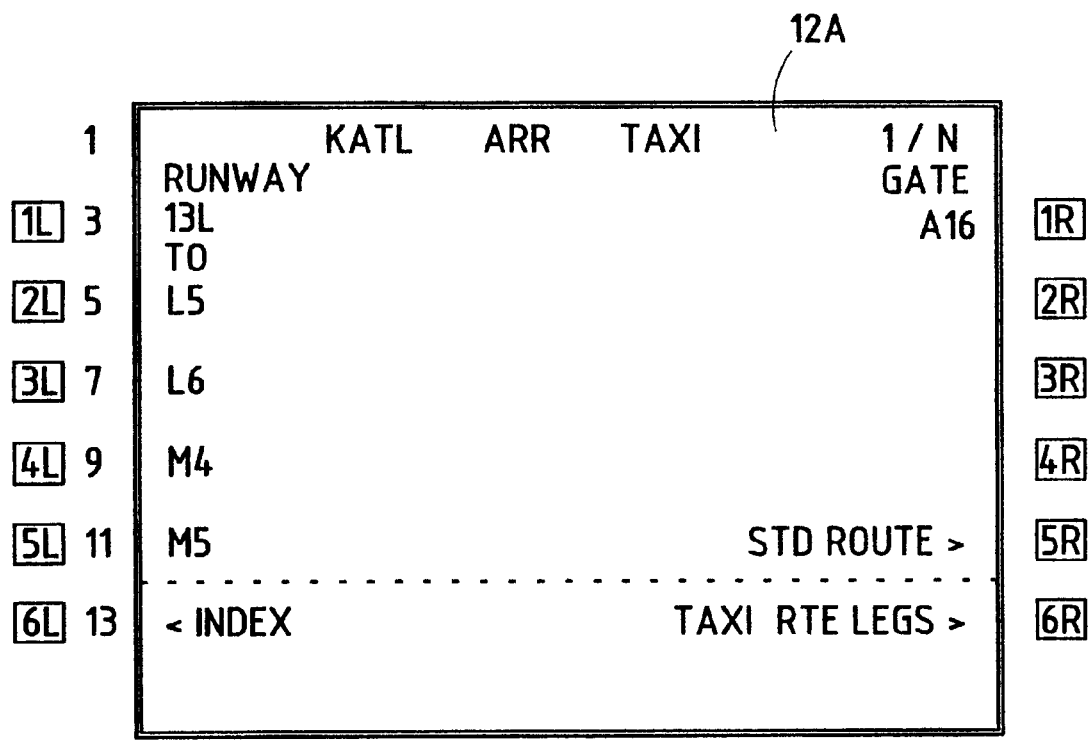
FIG. 5 is an example of an arrival taxi planning page according to the invention.

An exemplary menu of possible taxiways and connectors is shown in FIG. 5.

As illustrated, the possible taxiway selections comprise intersections L5, L6, M4, and M5. The letters and numbers assigned to the various runways, taxiways, connectors, and the like are unique to each airport and are stored in the linked list 13A in the NDB 13.

Figure 6A:
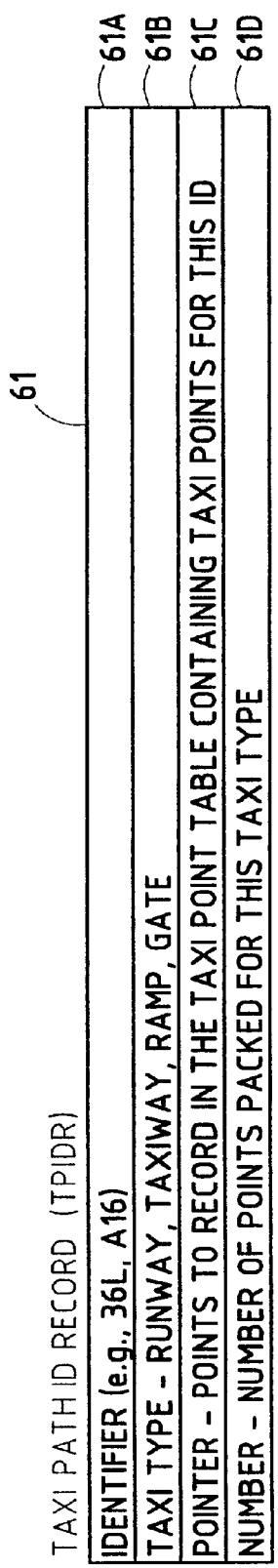
FIGS. 6A and 6B illustrate the tables comprising the linked list according to one embodiment of the invention.
Figure 6B:
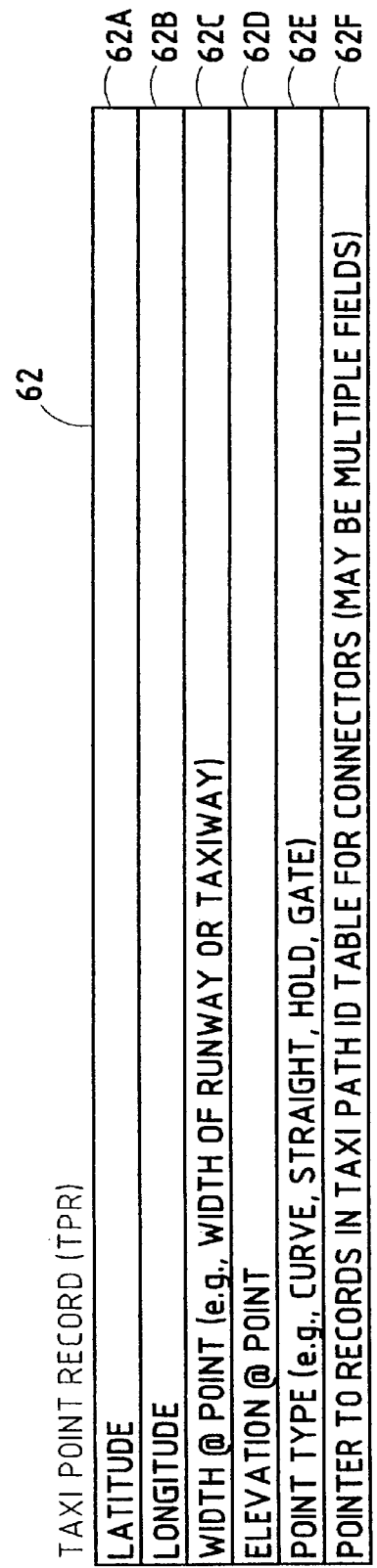
Figure 7:
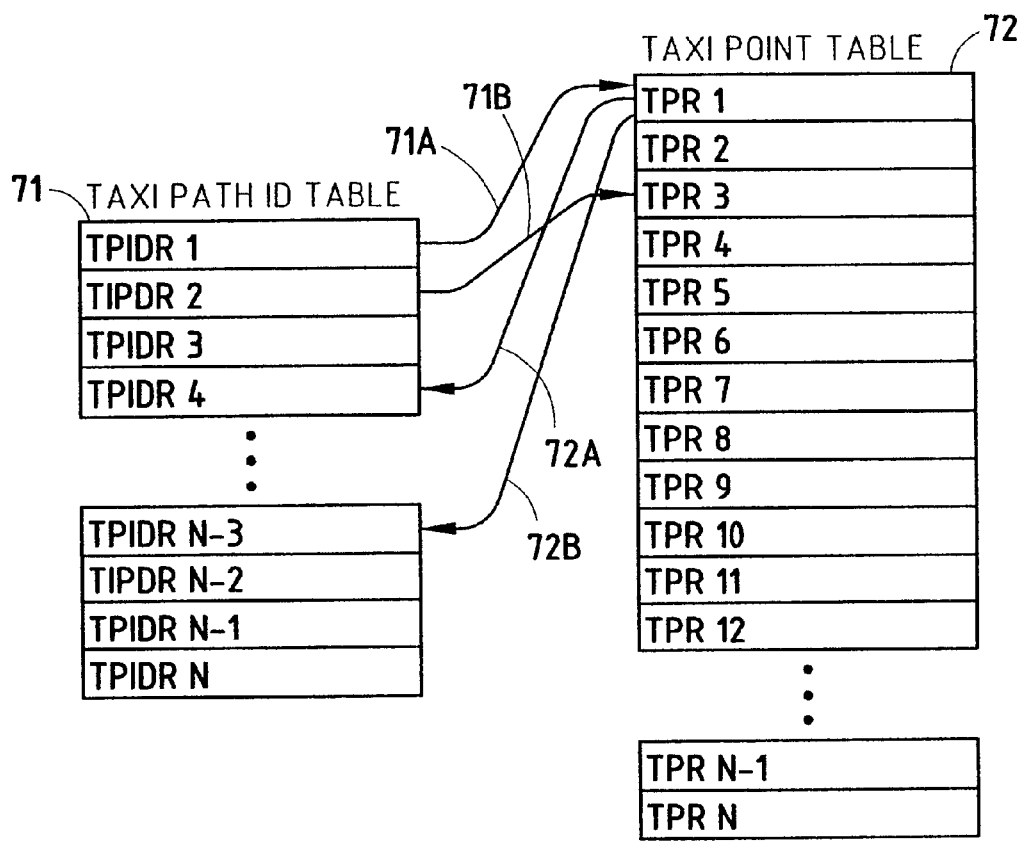
FIG. 7 illustrates a linked list according to one embodiment of the invention.

Another aspect of the invention is the database used to implement the taxi planning system of the invention. The database stores the airport taxi data for each airport. A linked list is preferably used to implement this aspect of the invention. The linked list is illustrated in FIGS. 6A, 6B, and 7. Two tables of data are linked together. The first table is the Taxi Path ID Table (TPIDT) 71 that is comprised of Taxi Path ID Records (TPIDR) 61.

The TPIDR 61 comprises an identifier field 61A such as 36L for a runway, A16 for a gate, or L5 for a taxiway connector. The taxi type field 61B identifies the instant path as a runway, taxiway, ramp, gate, or similar airport area. Pointer field 61C is a link to taxi point records (TPR) 62 in the taxi point table (TPT) 72 that contains taxi points associated for this taxi path ID. The number field 61D tells the program of the number of taxi points for this taxi ID.

The second table is the TPT 72 that is comprised of TPR 62. Each TPR 62 comprises a latitude field 62A and a longitude field 62B for precisely identifying the horizontal location of the point. A width field 62C identifies the width of the pavement at this point. The elevation field 62D contains the elevation of the point. This may be absolute elevation or a relative position relative to a reference point or monument on the airport. The point type field 62E identifies the point as to a particular characteristic (e.g., as part of a curve or straight surface, a hold point, or a gate). Certain points result in specific actions. For example, a HOLD point causes the system to prompt the pilot to acknowledge the hold before continuing. This is preferably accomplished by halting the advancing or scrolling of the display screen until the hold is acknowledged by the pilot by actuating a line select key 19.

The taxi point record includes another link 63F, labeled the pointer to records in the TPIDT 71. This field can be comprised of multiple links. For example, if an aircraft is present on a runway, there are typically many connectors to the taxiways. Using the pointer field, the processor 11A can quickly identify the possible taxiway and connectors and build an appropriate menu of taxi legs for the display on the menu.

The linked list between the two tables is shown in FIG. 7. Each record in the TPIDT 71 contains a link to a record in the TPT 72. These are indicated by links 71A and 71B. Similarly, many of the records in the TPT 72 contain multiple links to records in the TPIDT 71. This is illustrated by links 72A and 72B which show two links from record TPR 1 to records TPIDR 4 and TPIDR N-3.

The use of the linked list structure allows the invention to quickly identify appropriate taxi options and allows a pilot to quickly build a taxi plan comprising the taxi points in the NDB 13.

Figure 8:
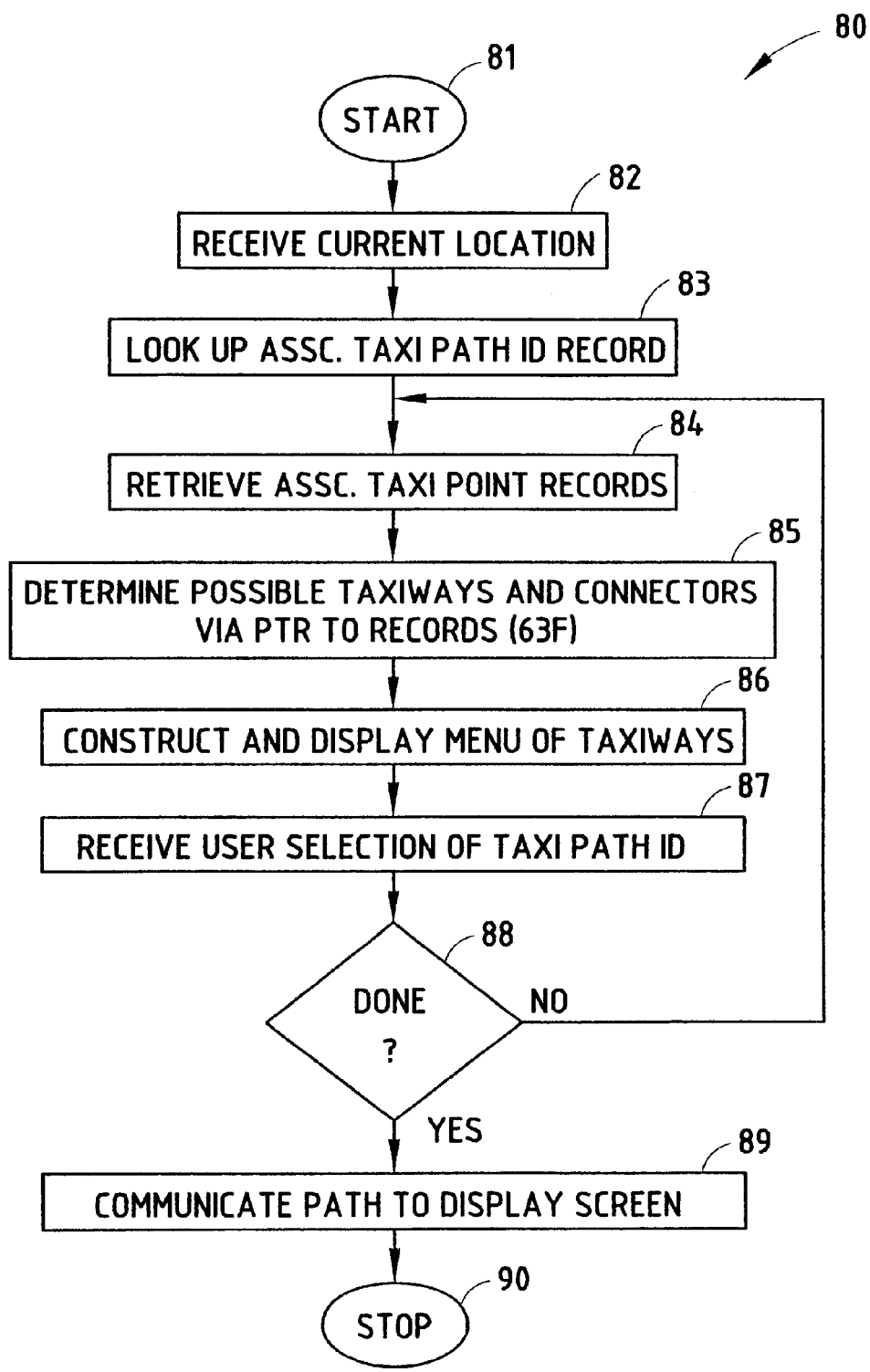
FIG. 8 is a flowchart of an algorithm to search through the linked list.

The method of the invention is illustrated in FIG. 8 using a flowchart 80. Beginning at START block 81 the method proceeds to receive the current location of the aircraft at the airport at block 82. This step is preferably accomplished via pilot entered data. The pilot may also enter this data while enroute to the destination airport. This step may also include receiving the destination location in a similar manner. Conversely, this data may be received by an automated data link to ATC or determined based on position data from a positioning system such as GPS.

The method proceeds to block 83 where the associated taxi path ID record is retrieved from the NDB. For example, if the aircraft is on runway 27R, then the taxi path ID record for 27R is retrieved. The taxi path ID record includes a pointer to the associated taxi point records that contain data such as, for example, the location points and width of a runway.

The associated taxi point records are retrieved in block 84. The taxi point records include pointers to possible taxiway and connectors that are appropriate taxi legs for the particular taxi point. The method proceeds to block 85 where possible taxiways and connectors are determined using the pointers to various taxi path records. There may be multiple pointers to various taxi path ID records. The method continues to block 86 where the various taxiways and connectors are formed into a menu of selections and displayed on the display screen. In block 87, the user input is received specifying the desired taxiway or connector.

The method continues to decision block 88 where the selected taxiway or connector is checked for a termination leg. For example, if the selection is a gate, then it is assumed that the taxi path plan is complete and the process finishes. If this is not the case, the process continues back to block 84 where the appropriate associated taxi point records are again retrieved. The process continues until the taxi plan is complete or the pilot terminates the plan prior to a conventional termination point. When the taxi path is selected, the path is displayed on the HDD, block 89, and overlays a map of the airport and thereby gives the pilot improved situational awareness.

It will become apparent to those skilled in the art that various modifications to the preferred embodiment of the invention as described herein can be made without departing from the spirit or scope of the invention as defined by the appended claims.

The invention claimed is:

1. An aircraft taxi planning system comprising:
   a user interface comprising,
      a display screen, and
      a selection input;
   a data storage device storing airport taxi data; and
   a processor in communication with said display screen and said selection input, wherein said processor generates a menu of possible taxi legs as a function of said airport taxi data and a prior taxi leg selection, wherein said taxi legs are appropriate to the aircraft location, and said processor communicates said menu to said display screen.

2. The aircraft taxi planning system of claim 1, wherein said airport taxi data comprises runway data, taxiway data, and gate data.

3. The aircraft taxi planning system of claim 1, wherein said data storage device stores a predefined standard taxi route.

4. The aircraft taxi planning system of claim 1, wherein display screen comprises a head-down display system.

5. The aircraft taxi planning system of claim 1, wherein display screen comprises a head-up display system.

6. The aircraft taxi planning system of claim 1, wherein display screen is selected from the group consisting of an electronic flight instrument system, a head-up display, a transponder, and a wireless communications system.

7. The aircraft taxi planning system of claim 1, wherein said user interface comprises a multifunction control display unit.

8. The aircraft taxi planning system of claim 1, wherein said processor comprises a flight management computer.

9. An aircraft taxi planning system comprising:
   a user interface comprising,
      a display screen, and
      a selection input;
   a data storage device storing airport taxi data; and
   a processor in communication with said display screen and said selection input, wherein said processor generates a menu of possible taxi legs as a function of said airport taxi data, wherein said taxi legs are appropriate to the aircraft location and said processor communicates said menu to said display screen, and wherein said airport taxi data is stored as a linked list.

10. A method of aircraft taxi planning comprising the steps of:
    receiving aircraft position data indicative of a position of an aircraft at an airport;
    generating a first menu of taxi legs appropriate for said aircraft position data;
    receiving a taxi leg selection signal indicative of a selected taxi leg from said first menu of taxi legs;
    generating a second menu of taxi legs appropriate for said selected taxi leg;
    generating a taxi path indicative of said selected taxi leg; and
    communicating a taxi path signal indicative of said taxi path to a display system.

11. The method of aircraft taxi planning of claim 10 further comprising the step of receiving aircraft destination data indicative of a destination position at said airport.

12. The method of aircraft taxi planning of claim 10, wherein the first generating step comprises generating a standard taxi route.

13. The method of aircraft taxi planning of claim 10 further comprising the step of transmitting said taxi path to a ground control system.

14. The method of aircraft taxi planning of claim 10, wherein said display system is selected from the group consisting of a head-down display system and a head-up display system.

15. A method of aircraft taxi planning comprising the steps of:
    receiving aircraft position data indicative of a position of an aircraft at an airport;
    generating a first menu of taxi legs appropriate for said aircraft position data;
    receiving a taxi leg selection signal indicative of a selected taxi leg from said first menu of taxi legs;
    generating a second menu of taxi legs appropriate for said selected taxi leg;
    generating a taxi path indicative of said selected taxi leg; and
    communicating a taxi path signal indicative of said taxi path to a display system, wherein the steps of generating a menu comprise searching a linked list of airport taxi data.

16. The method of aircraft taxi planning of claim 15, wherein said linked list comprises a taxi point table.

17. The method of aircraft taxi planning of claim 15, wherein said linked list comprises a taxi path ID table.

18. The method of aircraft taxi planning of claim 15, wherein said linked list comprises a point type field.

19. The method of aircraft taxi planning of claim 18, wherein said point type field comprises a HOLD value.

20. The method of aircraft taxi planning of claim 19 further comprising the step of soliciting an action by a pilot as a function of said aircraft approaching a taxi point associated with said HOLD value.

* * * * *